US012498201B2

(12) United States Patent
Merletti et al.

(10) Patent No.: US 12,498,201 B2
(45) Date of Patent: Dec. 16, 2025

(54) BALLISTIC PROTECTIVE MATERIAL FOR THE REDUCTION OF IMPACT TRAUMA

(71) Applicant: SAATI S.P.A., Appiano Gentile (IT)

(72) Inventors: Franco Merletti, Appiano Gentile (IT); Thomas Della Vedova, Appiano Gentile (IT); Carmine Lucignano, Appiano Gentile (IT); Paolo Canonico, Appiano Gentile (IT)

( * ) Notice: Subject to any disclaimer, the term of this patent is extended or adjusted under 35 U.S.C. 154(b) by 0 days.

(21) Appl. No.: 18/264,532

(22) PCT Filed: Mar. 8, 2022

(86) PCT No.: PCT/IB2022/052044
§ 371 (c)(1),
(2) Date: Aug. 7, 2023

(87) PCT Pub. No.: WO2022/189963
PCT Pub. Date: Sep. 15, 2022

(65) Prior Publication Data
US 2024/0302139 A1 Sep. 12, 2024

(30) Foreign Application Priority Data

| Mar. 10, 2021 | (IT) | .................. 102021000005618 |
| Mar. 10, 2021 | (IT) | .................. 102021000005624 |
| May 25, 2021 | (IT) | .................. 102021000013484 |

(51) Int. Cl.
*F41H 5/04* (2006.01)
*B32B 5/02* (2006.01)
(Continued)

(52) U.S. Cl.
CPC .......... *F41H 5/0478* (2013.01); *B32B 5/022* (2013.01); *B32B 5/024* (2013.01); *B32B 5/18* (2013.01);
(Continued)

(58) Field of Classification Search
CPC ........ F41H 5/04; F41H 5/0471; F41H 5/0478; F41H 5/0485; B32B 5/022; B32B 5/024;
(Continued)

(56) References Cited

U.S. PATENT DOCUMENTS

| 5,132,167 A * | 7/1992 | Prato .................. F41H 5/0485 442/164 |
| 2006/0252325 A1* | 11/2006 | Matsumura ............. B32B 25/10 2/2.5 |

(Continued)

FOREIGN PATENT DOCUMENTS

| KR | 20150003471 A * | 1/2015 | ............... F41H 1/04 |
| WO | WO-2018216975 A1 * | 11/2018 | ............. B32B 37/06 |

OTHER PUBLICATIONS

ISR; European Patent Office; NL; May 27, 2022.

*Primary Examiner* — Troy Chambers
*Assistant Examiner* — Benjamin S Gomberg
(74) *Attorney, Agent, or Firm* — Patshegen IP; Moshe Pinchas

(57) ABSTRACT

A ballistic protective material, characterized in that it comprises a laminate made of aramid fabric having one or more layers of thermoplastic or thermosetting matrix. The resulting composite can be produced by using a film, by applying powders or resins; the material is very flexible, in the form of a roll having the desired width and length.

2 Claims, 2 Drawing Sheets

(51) Int. Cl.
 *B32B 5/18* (2006.01)
 *B32B 5/24* (2006.01)
 *B32B 5/26* (2006.01)

(52) U.S. Cl.
 CPC ............... *B32B 5/245* (2013.01); *B32B 5/26* (2013.01); *B32B 2260/023* (2013.01); *B32B 2260/046* (2013.01); *B32B 2262/0253* (2013.01); *B32B 2262/0269* (2013.01); *B32B 2262/16* (2021.05); *B32B 2307/56* (2013.01); *B32B 2571/02* (2013.01)

(58) Field of Classification Search
 CPC .. B32B 5/18; B32B 5/245; B32B 5/26; B32B 2260/023; B32B 2260/046; B32B 2262/0253; B32B 2262/0269; B32B 2262/16; B32B 2307/56; B32B 2571/02
 USPC ......................................................... 89/36.02
 See application file for complete search history.

(56) References Cited

U.S. PATENT DOCUMENTS

| | | | |
|---|---|---|---|
| 2010/0279060 A1* | 11/2010 | Pilpel | B32B 37/12 428/113 |
| 2011/0005379 A1* | 1/2011 | Wang | F41H 5/0471 89/914 |
| 2011/0312238 A1* | 12/2011 | Bader | B32B 5/024 442/239 |
| 2012/0183716 A1* | 7/2012 | Jordan | F41H 5/023 428/221 |
| 2015/0135937 A1* | 5/2015 | Bader | B32B 37/26 156/247 |
| 2015/0323290 A1* | 11/2015 | Canonico | B32B 37/144 442/195 |
| 2016/0178326 A1* | 6/2016 | Strauss | F41H 5/04 89/36.02 |
| 2016/0326690 A1* | 11/2016 | Rozant | B32B 27/12 |

* cited by examiner

BALLISTIC PROTECTIVE MATERIAL FOR THE REDUCTION OF IMPACT TRAUMA

BACKGROUND OF THE INVENTION

The present invention concerns a ballistic protective material.

More specifically, the present invention concerns a material used as a base for the production of articles provided with ballistic protection, in particular for the production of bullet-proof vests optimized in terms of area density for specific standards with which the design of said articles is required to comply.

In this case, the material subject of the present invention is strategic in reducing the trauma resulting from the impact of a projectile.

The field of personal protection, as meant according to the invention, is characterized by the use of a wide range of materials, with the aim of meeting especially specific requirements in terms of ballistic performance and resistance to stabbing, but also requirements commonly known and considered important according to market surveys, such as flexibility, optimization of manufacturing waste, etc.

A ballistic solution for "soft armoring", as the functional part of a bullet-proof vest is called, is composed of many layers of different types of materials, each of which contributes totally or partially to one or more functions.

The list of materials used to compose a ballistic solution is very long and the combination of said materials is optimized especially thanks to a trial-and-error approach where the first test is defined on the basis of a starting database.

The products used include the following: aramid fabrics, polyethylene fabrics, aramid unidirectionals, polyethylene unidirectionals, aramid felts, metallic mesh, metallic plates, barriers with metallic or ceramic flakes, laminates made of resins/films on aramid or polyethylene fabrics, MTP (Multi Threat Penetration) sheets.

Among the purely ballistic materials there are identifiable categories able to perform both the purely ballistic function of stopping the projectile and reducing the trauma on the body protected, thanks to their capacity to absorb and/or disperse the energy discharged during the impact.

That being said, there are deficiencies in the category of pure "trauma reducers", a type of products that traditionally consist of composite systems, polymer backings, and others, characterized in general by high thickness and/or high rigidity.

This category does not necessarily comprise only materials having at least one base component specifically intended to perform a "ballistic function".

The ideal trauma reducer can be identified as a product which, if added minimally, e.g. one or two layers, as light and flexible as possible, inside a ballistic solution operating at the limit of the traumas specified in the reference standard, increases the safety margin, reducing the trauma by 3-4 mm on average without increasing the likelihood of complete perforation of said product.

Various products used for trauma reduction are known.

Products having this characteristic, even only partially, are listed below, divided into categories according to the way in which they perform their function.

A category of products comprises aramid- or polyethylene-based ballistic unidirectional materials; these are among the main materials that compose ballistic packages. The fact that they are composed of fiber held together by a certain amount of plastic matrix and are already present in large numbers in ballistic solutions (if intended to be part of those), allows them also to perform a general trauma-reducing function when compared with purely ballistic fabrics.

Another category comprises the laminated systems: usually composed of fabrics based on aramid/polyethylene fiber, single- or multilayer, characterized by the presence of a significant amount of thermoplastic or thermosetting matrix that makes them generally rigid. The area density ranges from 200 to 1000 $g/m^2$ and generally one or two layers are arranged in an embodiment, between the middle and bottom of the package. This rigidity is functional to reduction of the trauma, but is often not welcome by bullet-proof vest manufacturers. These products are often supplied in sheets rather than rolls, due both to the manufacturing process of said products and for easier management of this characteristic rigidity.

A further category comprises the plastic laminates consisting purely of rigid polymer sheets. These are less effective and less widely used than those described in the preceding point, but much cheaper. They are inserted in ballistic solutions in the same way.

Yet another category comprises backing materials, generally consisting of polymer foams or rubber-based derivatives, and are used as the last layer of a package. Their function is to absorb the shock wave of the impact and allow this mechanism to be optimized also for the other component layers, moving the contact thereof away from the rigid surface of the body behind the vest. The thicker they are, usually 1 to 6 mm, the more effective they are in theory, but much depends on their chemical composition.

SUMMARY OF THE INVENTION

The aim of the present invention is to provide a ballistic protective material that overcomes the drawbacks and limitations of the prior art materials cited above.

Within this aim, a particular object of the invention is to provide a material which, in terms of its functioning, is similar to the laminate systems but has decidedly more advantageous characteristics.

Another object of the invention is to provide a flexible material that can be directly sold in roll form, with the desired width and length, fully meeting user requirements.

A further object of the invention is to provide a material that has a high compatibility with the best-performing ballistic products available on the market.

Yet another object of the invention is to provide a material which, due to its particular production characteristics, is very reliable and safe in operation.

These and other objects, which will become clearer below, are achieved by a ballistic protective material as claimed in the appended claims.

BRIEF DESCRIPTION OF THE DRAWINGS

Further characteristics and advantages of the subject of the present invention will become clearer from an examination of the description of a preferred but non-exclusive embodiment of the invention, as illustrated.

DETAILED DISCLOSURE OF PREFERRED EMBODIMENTS

The material according to the invention is produced by means of direct lamination of aramid fabric with one or more layers of thermoplastic or thermosetting matrix.

The resulting composite can be obtained by using of a film, by applying powders or resins.

This results in a very flexible product, in the form of a roll having the desired width and length.

It is important to underline that, whatever anti-trauma product is considered, within any solution, there is an ideal arrangement for obtaining the best result, without varying the overall area density.

The variable concerning the arrangement of the anti-trauma product within the ballistic package is closely correlated with the number of layers and with all the component materials and, because it generally constitutes a small but very important part, its arrangement requires dedicated study for each ballistic embodiment.

The production of trauma reducer systems with appropriate performance for the objects of the present invention can be obtained from the following components: woven or non-woven fabrics composed of high tenacity and/or high modulus textile fibers typically used for ballistic applications or for the production of composites such as aramid fiber, high density polyethylene (UHMWPE), polypropylene, polyamide, polyimide, polyester, polyarylester, PBO, S-glass, E-glass, carbon fiber.

Among the textile fibers, with particular reference to aramid and high density polyethylene fibers, deniers between 110 and 3300 dtex are selected.

For each specific fabric there is an ideal amount of matrix for obtaining optimal trauma reduction performance, in turn linked to the chemical composition of the matrix and the way it interacts with each specific fiber.

By way of example, the following table shows a series of laminates representative of the invention having as components an aramid fabric with different fiber deniers and matrix percentages. One or two layers are inserted in the ballistic embodiment, including an anti-trauma component weighing approximately 500-600 g/m$^2$ relative to the overall area density of the ballistic package.

In the table below and in all the following ones, the acronym TDP refers to the impression left on clay in the part behind the panel resulting from a V0 test according to the NIJ0101.06 standard using as projectile the 44 Mag, i.e. the one that, at the given velocities, impacts the sample with the greatest energy.

Figure 1:
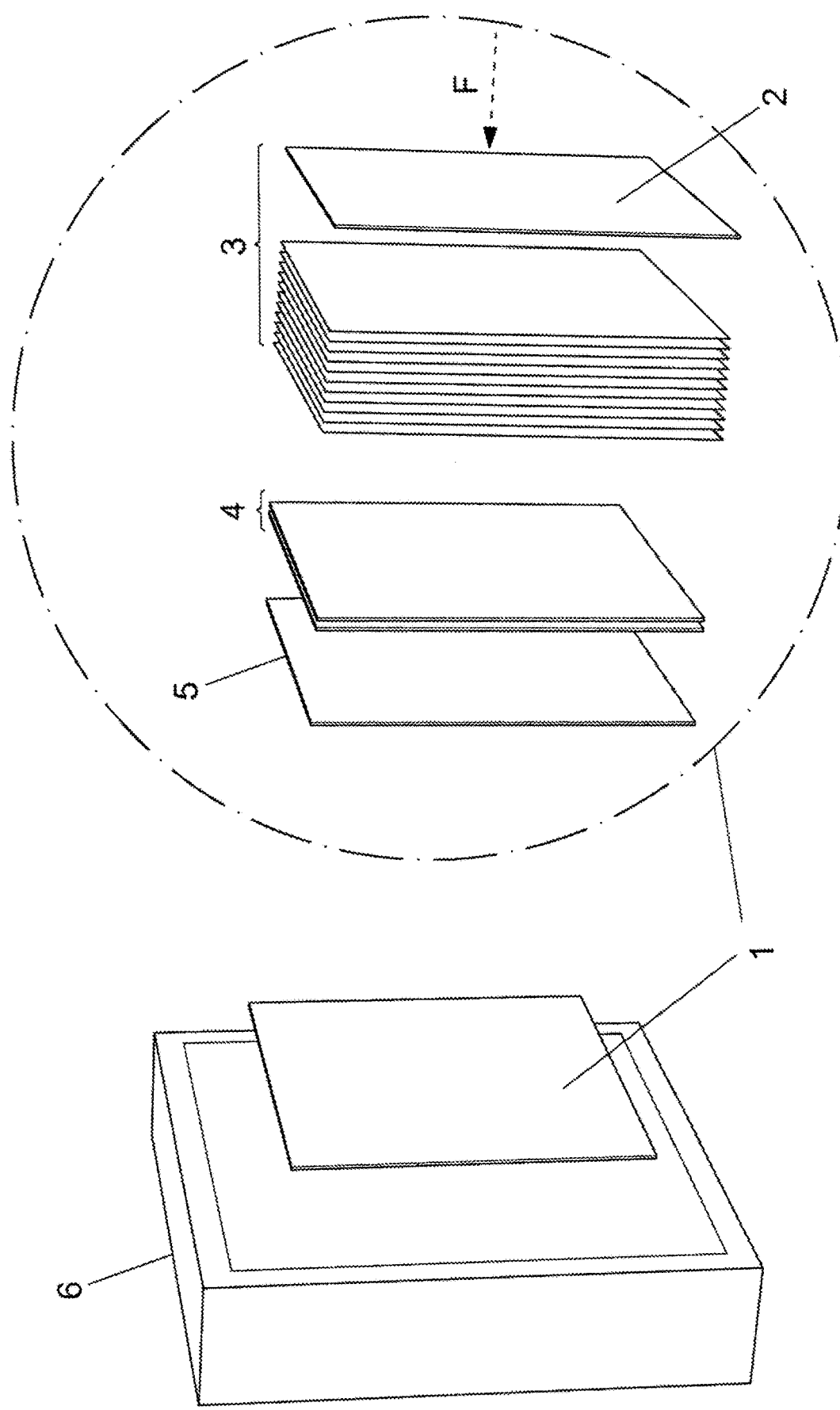
in FIG. 1 which shows an exploded view of the material of the invention; and in FIG. 2 which illustrates the laminate 7 with its enlarged detail.

FIG. 1 shows the ballistic embodiment 1 consisting of many overlapped layers and split into several sections representative of the different materials used as highlighted in the exploded view.

The front section 3 is formed of layers of material with purely ballistic function (namely stopping the projectile), of which the element 2 constitutes the first layer and also the impact surface. The section 4 is formed of the layers of laminate 7 of the invention, each consisting of a base fabric 9 and a matrix 8. The section 5 consists of a 3 mm thick layer of a polymer foam also called backing. The element 6 represents the frame containing the clay on which the TDP measurements are carried out following the impact of the projectile.

Considering that the limit of conformity indicated by the standard is 44 mm, the lower the TDP value obtained, the more efficient the laminate 4 in performing its function.

TABLE 1

| Laminate 7 | Denier of fiber of base fabric 9 (dtex) | Weight of matrix 8/Weight of laminate 7 (%) | Area density of single layer of laminate 7 [g/m$^2$] | Average TDP* (mm) |
|---|---|---|---|---|
| TRS 1 | 1100 | 37 | 295 | 36.5 |
| TRS A | 940 | 32 | 285 | 39.0 |
| TRS B | 3140 | 35 | 616 | 43.5 |

*Calculation performed from the average of the TDP measurements carried out according to standard NIJ0101.06 using the 44 Mag.

The above table shows generically that products based on fabrics 9 having different fiber deniers (column 2) and similar percentages of matrix 8 (column 3) can give significantly different TDP results (column 5).

Among the matrixes that can be used, thermoplastic or thermosetting resins are selected having chemical composition based on polymers such as: polyethylenes, polyurethanes, polypropylene, polyamide, polyester, polyarylester, polyvinyl butyral, polycarbonate, phenolic, epoxy, phenoxy, polyurethane and acrylic resins.

The amount of matrix 8 required in percentage, with respect to the total weight of the laminate, can vary from 5 to 50%, and the ideal amount is closely correlated with the characteristics of the woven or non-woven fabric with which it is combined, as already mentioned in Table 1.

Table 2 concerns an embodiment referring to an aramid fabric weighing 185 g/m$^2$, with fibers 10 having 1100 dtex; the variable analyzed is the weight percentage of matrix 8 based on the total weight of the laminate 7. Maintaining completely unchanged the base fabric 9 composing the laminate 7 and using different percentages of matrix 8, the comparison between the laminates TRS 1, TRS 2 and TRS 3 shows that a quantity exists that optimizes the performance in terms of TDP.

TABLE 2

| Laminate 7 | Weight of matrix 8/Weight of laminate 7 (%) | Area density of single layer of laminate 7 [g/m$^2$] | Average TDP* (mm) |
|---|---|---|---|
| TRS 1 | 37 | 295 | 36.5 |
| TRS 2 | 49 | 365 | 42.0 |
| TRS 3 | 10 | 205 | 41.0 |

*Calculation performed from the average of the TDP measurements carried out according to standard NIJ0101.06 using the 44 Mag.

In the case of the fabric 9, in addition to the area weight and denier of the component fiber/s, the number of threads per centimeter and the type of weave chosen are important parameters.

Table 3 concerns an embodiment referring to an aramid fabric weighing 185 g/m$^2$, with 1100 dtex fiber, with the same percentage of matrix 8 and weight of the laminate 7, the only variable being the weave of the fabric 9.

TABLE 3

| Laminate 7 | Weave of fabric 9 | Average TDP* (mm) |
|---|---|---|
| TRS 1 | Plain | 36.5 |
| TRS 4 | Batavia 2/2 | 42.0 |
| TRS 5 | Batavia 4/4 | 43.5 |
| TRS 6 | Batavia 3/1 | 40.0 |

*Calculation performed from the average of the TDP measurements carried out according to standard NIJ0101.06 using the 44 Mag.

In this case it can be seen from the TDP values that a very "closed" weave as in the case of TRS 1 is preferable to weaves defined as "open" like those of the laminates TRS 4, TRS 5 and TRS 6.

The arrangement of the anti-trauma system thus produced, in terms of the number of layers composing the ballistic embodiment 1 of FIG. 1, is between 40 and 100% of the package, considering as initial position the layer 2 which also constitutes the impact surface of said ballistic embodiment 1 (FIG. 1).

The application of the matrix 8 can also be asymmetrical with respect to the fabric 9 used; in fact, the study conducted highlights that application of the same percentage of matrix on one single side of a support fabric, rather than being distributed equally over the two sides, can be a decisive factor for the performance of said fabric.

Figure 2:
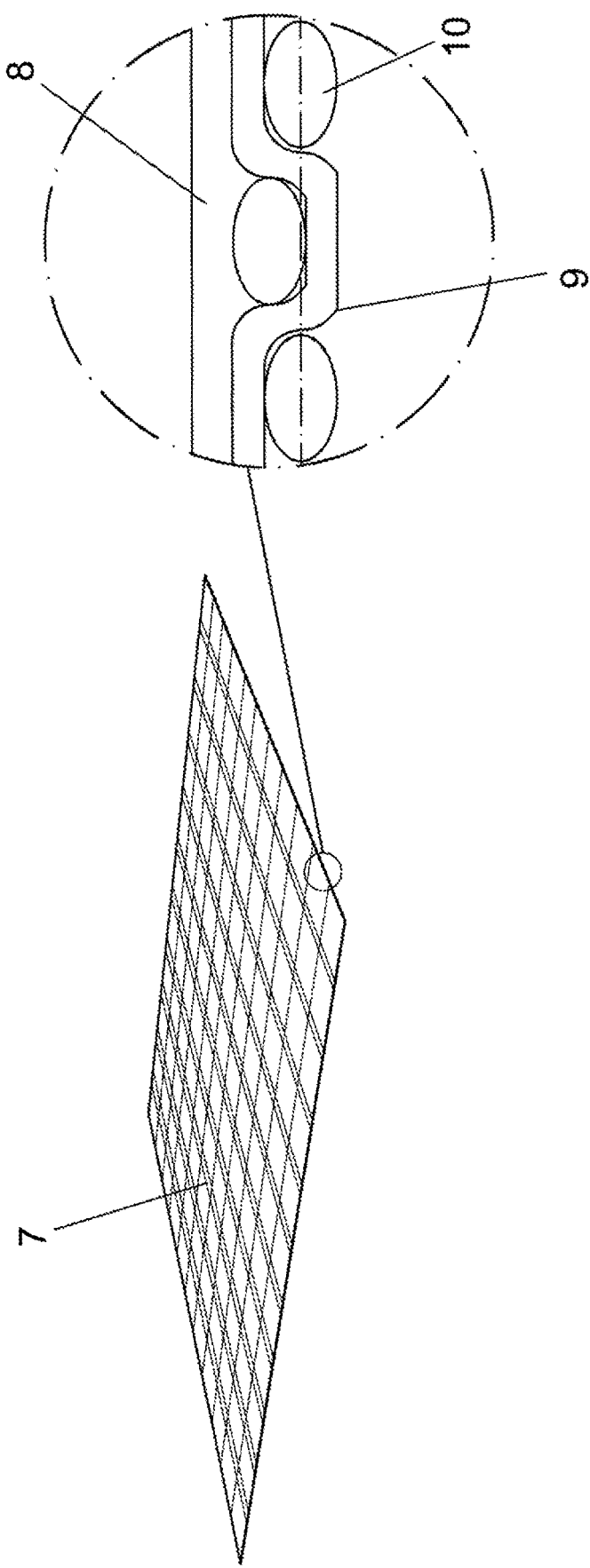

Table 4 shows a comparison of products with symmetrical/asymmetrical arrangement of the matrix on the fabric. When the laminate of the invention is asymmetrical, the side of the matrix 8—shown in FIG. 2 together with the base fabric 9—is inserted in the ballistic embodiment facing the firing direction as indicated in FIG. 1 (arrow F).

TABLE 4

| Laminate 7 | Fiber denier of fabric 9 (dtex) | Weave of fabric 9 | Weight of matrix 8/ Weight of laminate 7 (%) | Configuration of laminate 7 | Average TDP* (mm) |
|---|---|---|---|---|---|
| TRS 1S | 1100 | Plain | 37 | Symmetrical | 43.0 |
| TRS 1A | 1100 | Plain | 37 | Asymmetrical | 36.5 |

*Calculation performed from the average of the TDP measurements carried out according to standard NIJ0101.06 using the 44 Mag.

The TDPs of the two laminates compared highlight that the asymmetrical configuration of TRS 1A is significantly more effective than the symmetrical configuration of TRS 1S using exactly the same base fabric 9 and the same percentage of matrix 8.

All the examples shown in this table use as a reference an embodiment of approximately 5.2 Kg/m$^2$ (FIG. 1) composed of:

1 multilayer Corematrix®+11 layers of multiaxial Dupont (XP308)®+2 layers of antitrauma+1 layer of foam backing 5 (3 mm).

Table 5 shows a comparison between the standard embodiment having two further layers of XP308 in place of the antitrauma, the same modified with a standard antitrauma available on the market (STD Antitrauma) and analogously the same modified with the antitrauma TRS 1 subject of the present invention; each of them substitutes an equivalent part in weight with respect to the multiaxial present in the base embodiment.

TABLE 5

| Antitrauma | Area density of ballistic embodiment [g/m$^2$] | Average TDP* (mm) |
|---|---|---|
| XP308 | 5.2 | 42.0 |
| STD Antitrauma | 5.2 | 40.0 |
| TRS 1 (laminate 7) | 5.2 | 36.5 |

*Calculation performed from the average of the TDP measurements carried out according to standard NIJ0101.06 using the 44 Mag.

The TDP values detected for the laminate TRS 1 of the invention are a significant improvement in comparison with both the embodiment XP308 and the same modified with the STD standard antitrauma commonly used and representative of the market standard.

In the light of all the considerations made up to this point, a set of values is specified within the indicated ranges for the critical parameters analyzed so far that optimize the performance of the innovative trauma-reducer product presented here:

aramid fiber with denier 670, 940, 1100, 1320, 3140, 3300 dtex;

matrix content between 15 and 40% by weight for deniers above 3000 dtex and resin percentage between 25% and 40% for intermediate deniers between 670 and 1320 dtex;

the plain weave is ideal for the production of a trauma reducer as shown in Table 3;

the asymmetrical application of the matrix 8 on the fabric 9 and insertion with matrix side facing the firing direction in the test phase are critical factors for performance as shown in Table 4.

The flexibility of the composite system thus identified is essential for increasing the compatibility with the other purely ballistic products.

In practice it has been found that the invention achieves the intended aim and objects.

In fact, a very flexible material has been provided that can be sold directly in roll form having the desired width and length, according to user requirements.

Thanks to these particular features, it is highly compatible with the best performing purely ballistic products available on the market, also characterized in general by a high level of flexibility.

Naturally the materials used, as well as the contingent size, can be any, according to requirements. Furthermore, it will be possible to use foam backings 5 made of different materials, for example analogous to those used to produce the section 3 of FIG. 1; the latter can also be omitted, however. Lastly, it is possible to provide even only one laminate 7.

The invention claimed is:

1. A ballistic protective material for a ballistic solution comprising:

a front section (3) of layers of material adapted for stopping a projectile, said front section (3) comprising a first layer element (2) having an impact surface for the projectile, a section (4) of layers (7) formed of a laminate made of material consisting of a base fabric (9) and a matrix (8) adapted for absorbing energy and impact trauma reduction, said matrix (8) including a thermoplastic or thermosetting resin having a chemical composition selected from the group consisting of: polyethylenes, polyurethanes, polypropylene, polyamide, polyester, polyarylester, polyvinyl butyral, polycarbonate, phenolic, epoxy, phenoxy, and acrylic resins, said matrix (8) being asymmetrical with respect to said base fabric (9) by being applied on one single side of said base fabric (9), and said matrix (8) facing a firing direction (F) of the projectile, said base fabric (9) is an aramid fabric with a plain weave, said aramid fabric having a linear density selected from the group consisting of 670 dtex, 940 dtex, 1100 dtex, 1320 dtex, 3140 dtex, and 3300 dtex, and said matrix (8) comprising 15 to 40% of a total weight of the laminate when the linear density of said aramid fabric is 3140 dtex or 3300 dtex, and said matrix (8) comprising 25 to 40% of the total weight of the laminate when the linear density of said aramid fabric is 670 dtex, 940 dtex, 1100 dtex, or 1320 dtex.

2. The material according to claim 1, further comprising a section (5) made of polymer foam.

\* \* \* \* \*